United States Patent [19]

Ivanko

[11] 4,042,434
[45] Aug. 16, 1977

[54] BONDED GEAR ASSEMBLY

[75] Inventor: Theodore Ivanko, Fairfield, Conn.

[73] Assignee: Avco Corporation, Stratford, Conn.

[21] Appl. No.: 675,752

[22] Filed: Apr. 12, 1976

[51] Int. Cl.² .............................................. B32B 7/04
[52] U.S. Cl. ........................................ 156/91; 29/460;
74/432; 74/439; 156/305; 156/309; 156/145;
264/261; 308/239
[58] Field of Search ................. 156/91, 242, 245, 309,
156/330, 305, 145; 308/239, 241; 29/460;
264/260, 261; 74/432, 439, 446

[56] References Cited
U.S. PATENT DOCUMENTS

| | | | |
|---|---|---|---|
| 2,748,618 | 6/1956 | Lee | 74/439 |
| 2,785,580 | 3/1957 | Andrews | 74/432 |
| 3,116,198 | 12/1963 | Grawey et al. | 156/91 |
| 3,339,609 | 9/1967 | Cushman | 29/460 |

Primary Examiner—Edward G. Whitby
Attorney, Agent, or Firm—Irwin P. Garfinkle; Robert J. McNair, Jr.

[57] ABSTRACT

A method is disclosed for firmly bonding together driving and driven gears. Bonding is accomplished by placing a thin layer of a thermal setting resin between the web faces of gears that are joined together by a multiplicity of spaced apart fasteners. The cured resin acts both as a load carrying joint and as a gasket.

3 Claims, 3 Drawing Figures

BONDED GEAR ASSEMBLY

BACKGROUND OF THE INVENTION

Driving and driven gears are conventionally fastened together by a multiplicity of bolts which join the gears at their webs. For many applications the bolted together gear trains function satisfactorily. However, this method of attachment can result in problems in many instances. Measurable flexing will occur between the web faces of gears joined only by bolts. This flexing causes the mating web faces of the bolted together gears to become pitted and fretted after many hours of use. The abrading away of metal tends to loosen bolts and the pits serve as loci for cracks.

Various types of shim stock and gaskets have been tried for alleviating the pitting and fretting problem. None have worked satisfactorily. Shim stock made from metal softer than was used in making the gears, has been found to pound out thinner causing the bolts to loosen. Coating the mating faces of the gear webs with a graphite lubricating film helps some, but still results in a shortened life expectancy for the gears.

A method for applying an unhardened adhesive to a stack of laminations is known. Sims and Avila in U.S. Pat. No. 3,620,886 disclose a method for bonding a laminated structure. Weld bonding of panels to each other and to framing structures has also been accomplished. Neither of these result in an application similar to my invention.

SUMMARY OF THE INVENTION

This invention relates to a method for bonding a driven gear to a driving gear so that cyclic flexing of the gears during use does not cause wear and abrasion between adjoining faces of the assembly. To accomplish bonding, a shallow annulus is made in the face of at least one of the mating gear webs. The driving and driven gears are then joined together as by bolts. Low viscosity resin is then injected under pressure into the annulus through an access orifice. After curing, the thermal setting resin forms a load carrying bond between the gear members. In combination then, the hardened resinous material and the mechanical fasteners reliably transmit torque from the driving to the driven gear members. Stresses within the gear web are distributed throughout the bonded surfaces instead of being concentrated around the mechanical attachment points.

DESCRIPTION OF THE PREFERRED EMBODIMENTS

Figure 1:
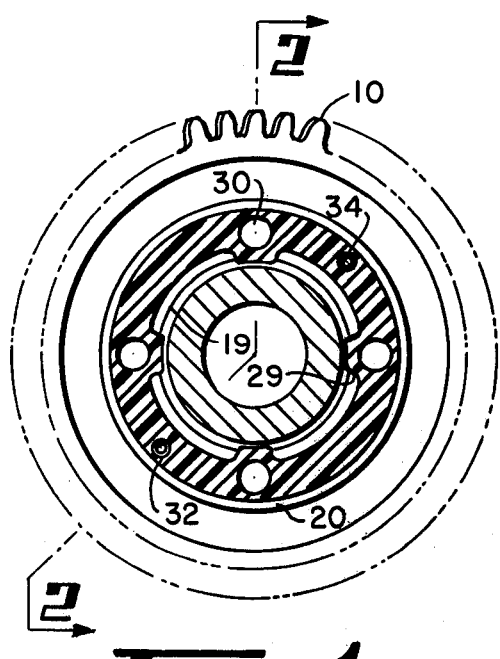
FIG. 1 is a web-on frontal view of a gear showing the resinous bonding material in place within a shallow annulus formed in the web face.
Figure 2:
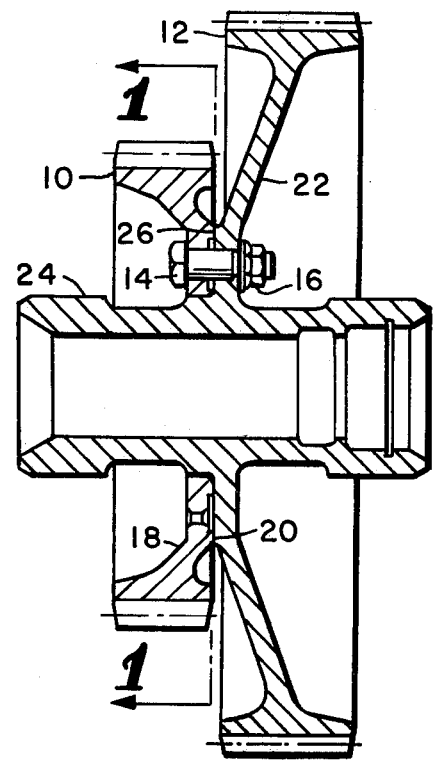
FIG. 2 shows a cross-sectional view of two gears joined together according to the method of this invention.

FIGS. 1 and 2 show a driven gear 10 attached to a driving gear 12 by means of a multiplicity of bolts 14 and nuts 16. Driven gear 10 is formed with a web 18 extending from a central hub 19 having a face 20. Driving gear 12 has a web 22 extending from a central hub 24 having a face 26 complementary to the face 20. Driving gear 12 may get its power either axially or through another gear, not shown. In any case, power from the gear 12 is transferred from web 22 of gear 12 to web 18 of gear 10. Such transfer of power is achieved through the bolts 14 and by means of the hardened resinous bond which is molded in annulus 28 (see FIG. 2) between the faces 20 and 26.

In order to accomplish bonding, the shallow annulus 28 is formed in the trued face 20 of web 18. Annulus 28 has lands 29 formed around and concentric with the holes 30 through which the bolts 14 pass. Access orifice 32 and 34 are formed in web 18. In practice the depth of the annular cut made in the surface of web 18 was between 0.005 and 0.010 inches.

For clarification, FIG. 1 is a side view of gear 10 made along line 1—1 of FIG. 2. FIG. 2 is a cross-sectional view of gears 10 and 12 taken along line 2—2 of FIG. 1. The FIG. 2 drawing was made along line 2—2 of FIG. 1 in order to better depict the arrangement of the holes 30 for bolts 14 and the access orifice 32 through which resin is injected into annulus 28.

After forming annulus 28, gears 10 and 12 are cleaned and degreased. The mating gears are then assembled as shown in FIG. 2 and bolts 14 inserted. Self-locking nust 16 are fastened to bolts 14 and partially torqued down. The mating surfaces or webs 22 and 18 thus form both halves of a mold around annulus 28.

Thermal setting resin is then injected through access orifice 32. Orifice 34 acts to vent air out of the spaces between the gears, thus ensuring that the resin completely fills all spaces and cavities. In this way not only the annular ring is filled but also any voids between bolts 14 and web holes 30. Subsequent to injection, the resinous material is cured. Curing will depend on the type of resin used. In the unit reduced to practice a filled epoxy resin sold under the trade name "NOVOLAC" was found to provide good results.

After curing, the multiplicity of nuts 16 are torqued to their design values and the gear assembly is ready for use.

Figure 3:
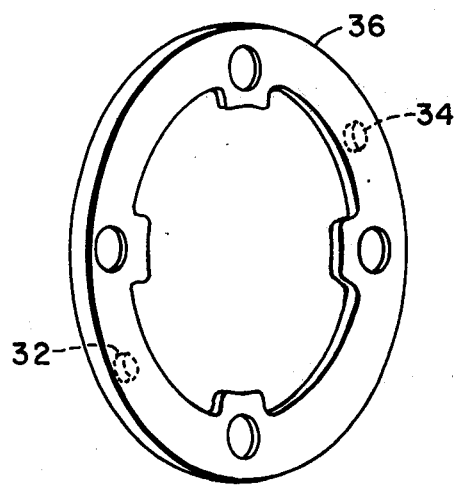
FIG. 3 is a perspective view of thermal setting bonding material after it has set between the driving and driven members of the gear assembly shown in FIG. 2.

The cured resinous ring 36 will have the general shape shown in FIG. 3. However, it should be pointed out that the entire exterior surface of the FIG. 3 ring 36 will in actual practice be integrally bonded to webs 22 and 18 of gears 12 and 10, respectively.

While FIGS. 1-3 depict the preferred embodiment, other bonding approaches are also possible using the principles of my invention. For example, instead of forming annulus 28 in the face of web 18, one can surface etch the mating faces of webs 22 and 18. Etching as by an acid is done only to achieve a roughened surface on the mating parts. A thixotropic adhesive paste such as Hysol EA 9312 THIXO is then spread on the mating parts and the gears assembled by means of bolts 14 and self locking nuts 16. The bolts are partially torqued while the gears are checked for alignment. The assembled gear specimen is then cured for an hour at 250° to set up the paste adhesive. The result is a driving and driven gear assembly which is both mechanically and resinously bonded into a reliable working unit.

While the above description has been presented in terms of the joining together of driving and driven gear members, other uses of my bonding method are foreseen. Any assembly requiring the interfacing of components which are difficult to form or machine as an integral whole, can profitably make use of this bonding method. The parts can be individually formed and then assembled by a combination of mechanical fasteners and load bearing resinous bonds.

What is claimed as new is:

1. A method of interconnecting driving and driven gear members by combination mechanical fastener and resinous bonding means, comprising the steps of:
    forming complementary mating faces on adjoining web portions of the driving and driven gears;
    removing an annulus of material from selected portions of said complementary faces to form a cavity between said faces;
    forming an access orifice in the web portion of one of said gears, said orifice providing communication with the between-web cavity formed when mating faces of said driving and driven geared are joined;
    fastening together by mechanical means the driving and driven gears, said fastening means serving to coaxially secure the driven gear to the driving gear, said fastening means providing a transfer of torque from the web of said driving gear to the web of said driven gear;
    injecting thermal setting resin through said access office and filling said cavity between said faces of said gears;
    curing said resin to its hardened state; and
    readjusting said mechanical fasteners to prescribed torque values whereby load carrying capabilities between gear members are optimized.

2. The invention as set forth in claim 1 in which the thermal setting resin used for filling the cavity is an epoxy.

3. The invention as set forth in claim 1 in which the thermal setting resin used for filling the cavity is a filled epoxy.

* * * * *